US012637160B2

(12) United States Patent  
Lutz et al.

(10) Patent No.: US 12,637,160 B2  
(45) Date of Patent: May 26, 2026

(54) STRETCH TRAILER WITH PIVOTABLE ROLLER MECHANISM

(71) Applicant: Master Solutions, Inc., Carlisle, PA (US)

(72) Inventors: David W. Lutz, Carlisle, PA (US); Steve Keitel, Mechanicsburg, PA (US)

(73) Assignee: Master Solutions, Inc., Carlisle, PA (US)

( * ) Notice: Subject to any disclaimer, the term of this patent is extended or adjusted under 35 U.S.C. 154(b) by 451 days.

(21) Appl. No.: 18/479,860

(22) Filed: Oct. 3, 2023

(65) Prior Publication Data

US 2024/0109615 A1      Apr. 4, 2024

Related U.S. Application Data

(60) Provisional application No. 63/412,691, filed on Oct. 3, 2022.

(51) Int. Cl.

| | |
|---|---|
| B62D 63/06 | (2006.01) |
| B62D 29/04 | (2006.01) |
| B62D 53/06 | (2006.01) |
| B62D 21/14 | (2006.01) |

(52) U.S. Cl.  
CPC ......... B62D 63/061 (2013.01); B62D 29/041 (2013.01); B62D 53/061 (2013.01); *B62D 21/14* (2013.01)

(58) Field of Classification Search  
CPC .. B62D 63/061; B62D 29/041; B62D 53/061; B62D 21/14; B62D 53/067  
See application file for complete search history.

(56) References Cited

U.S. PATENT DOCUMENTS

| | | | | | |
|---|---|---|---|---|---|
| 3,239,274 | A | * | 3/1966 | Weiss | B62D 21/14 |
| | | | | | 280/789 |
| 3,508,762 | A | * | 4/1970 | Pratt | B60P 1/6427 |
| | | | | | 280/407.1 |
| 3,838,868 | A | * | 10/1974 | Robertson | B62D 53/067 |
| | | | | | 280/656 |
| 4,561,671 | A | | 12/1985 | DeWitt et al. | |
| 4,566,714 | A | * | 1/1986 | De Witt | B60P 1/6481 |
| | | | | | 280/142 |
| 4,877,293 | A | | 10/1989 | French et al. | |
| 5,183,371 | A | | 2/1993 | O'Daniel | |
| 6,010,141 | A | | 1/2000 | Huntimer et al. | |
| 6,969,104 | B2 | | 11/2005 | Green | |
| 7,845,700 | B2 | | 12/2010 | Gosselin et al. | |

(Continued)

*Primary Examiner* — Valentin Neacsu  
*Assistant Examiner* — Marlon A Arce  
(74) *Attorney, Agent, or Firm* — The Webb Law Firm

(57) ABSTRACT

A trailer moveable by a cab includes: a first section including a cavity; and a second section including a beam at least partially positioned within the cavity and a height-variable member attached to the beam, where the second section is longitudinally movable relative to the first section, such that a length of the trailer is variable, where the second section includes a cart pivotably attached to the beam at a fulcrum, where the cart includes at least one wheel configured to roll along a floor of the cavity, where the cart is pivotable about the fulcrum to co-act with the height-variable member, where the second section is configured to move longitudinally relative to the first section by the cart rolling along the floor of the cavity.

20 Claims, 11 Drawing Sheets

(56)                    References Cited

U.S. PATENT DOCUMENTS

|  |  |  |  |  |  |
|---|---|---|---|---|---|
| 8,136,858 | B2 | | 3/2012 | Gosselin et al. | |
| 8,353,523 | B2 | | 1/2013 | Pedersen | |
| 8,657,323 | B2 | | 2/2014 | Pedersen | |
| 9,988,113 | B2 | | 6/2018 | Habernegg | |
| 10,543,875 | B2 | | 1/2020 | Morena et al. | |
| 11,873,035 | B2 | * | 1/2024 | Lutz .................... | B62D 63/061 |
| 2009/0182470 | A1 | * | 7/2009 | Garvey ................ | A01D 34/662 |
| | | | | | 701/50 |
| 2011/0175397 | A1 | | 7/2011 | Amrine, Jr. et al. | |
| 2021/0179204 | A1 | | 6/2021 | Lutz et al. | |
| 2023/0322311 | A1 | * | 10/2023 | Awad ................... | B60P 1/6418 |

* cited by examiner

STRETCH TRAILER WITH PIVOTABLE ROLLER MECHANISM

CROSS-REFERENCE TO RELATED APPLICATION

This application claims the benefit of U.S. Provisional Application No. 63/412,691, filed Oct. 3, 2022, the disclosure of which is hereby incorporated by reference in its entirety.

BACKGROUND

1. Field

The present disclosure relates a trailer movable by a cab, a towing system, and a method for adjusting a length of a trailer moveable by a cab.

2. Technical Considerations

Stretch trailers capable of being adjusted to various lengths require that the user move a first section of the trailer relative to a second section of the trailer to attain the predetermined length and fix the trailer at that predetermined length. Friction forces associated with moving the first section relative to the second section can make it difficult to adjust the length of the trailer to the predetermined length.

SUMMARY

The present disclosure is directed to a trailer moveable by a cab, including: a first section including a cavity; and a second section including a beam at least partially positioned within the cavity and a height-variable member attached to the beam, where the second section is longitudinally movable relative to the first section, such that a length of the trailer is variable, where the second section includes a cart pivotably attached to the beam at a fulcrum, where the cart includes at least one wheel configured to roll along a floor of the cavity, where the cart is pivotable about the fulcrum to co-act with the height-variable member, where the second section is configured to move longitudinally relative to the first section by the cart rolling along the floor of the cavity.

The height-variable member may be configured to compress or decompress based on a load experienced by the trailer. The height-variable member may include a deformable pad and/or a spring. The height-variable member may include a hydraulic ram and/or a pneumatic airbag. The second section further may include a friction reducing pad adjacent the cart. The friction reducing pad may include a plastic material. The plastic material may include a self-lubricating plastic material.

The trailer may be configured such that: with the load experienced by the trailer below a threshold, the cart is in a first position in which the at least one wheel is in contact with the floor of the cavity and the friction reducing pad is not in contact with the floor of the cavity; and with the load experienced by the trailer above the threshold, the cart is pivoted to a second position in which the at least one wheel is in contact with the floor of the cavity and the friction reducing pad is in contact with the floor of the cavity. The trailer may be configured such that: with the load experienced by the trailer below a threshold, the cart is in a first position in which the at least one wheel is in contact with the floor of the cavity and the height-variable member has a first thickness such that the friction reducing pad is not in contact with the floor of the cavity; and with the load experienced by the trailer above the threshold, the cart is pivoted to a second position in which the at least one wheel is in contact with the floor of the cavity and the height-variable member is compressed to have a second thickness smaller than the first thickness such that the friction reducing pad is in contact with the floor of the cavity.

The second section further may include a contactable region adjacent the cart. The trailer may be configured such that: with the load experienced by the trailer below a threshold, the cart is in a first position in which the at least one wheel is in contact with the floor of the cavity and the height-variable member has a first thickness such that the contactable region is not in contact with the floor of the cavity; and with the load experienced by the trailer above the threshold, the cart is pivoted to a second position in which the at least one wheel is in contact with the floor of the cavity and the height-variable member is compressed to have a second thickness smaller than the first thickness such that the contactable region is in contact with the floor of the cavity. The height-variable member may be attached to a top side of the beam, and the friction reducing pad may be attached to an opposing bottom side of the beam. The cart may be arranged on a first end of the beam which first engages the cavity, where the cart further includes a shield arranged on the first end of the beam at a height configured to clear debris from the floor of the cavity when the cart is rolled along the floor of the cavity. The trailer may include a low boy trailer.

The first section may include a front end defining a front cavity and a rear end defining a rear cavity; where the second section may be at least partially positioned within the front cavity; where the trailer further may include a third section at least partially positioned within the rear cavity, where the third section may be longitudinally movable relative to the first section, such that a length of the trailer may be variable, where the third section may include a second beam at least partially positioned within the rear cavity and a second height-variable member attached to the second beam, where the third section may include a second cart pivotably attached to the second beam at a second fulcrum, where the second cart may include at least one second wheel configured to roll along a floor of the rear cavity, where the second cart may be pivotable about the second fulcrum to co-act with the second height-variable member, where the third section may be configured to move longitudinally relative to the first section by the second cart rolling along the floor of the rear cavity.

The present disclosure is also directed to a towing system including a cab and the trailer described herein connected to the cab.

The present disclosure is also directed to a method for adjusting a length of a trailer moveable by a cab, including: providing a first section of the trailer, the first section including a cavity; inserting a second section of the trailer into the cavity and moving the second section longitudinally relative to the first section to a first trailer length; and fixing the trailer at the first trailer length by restricting longitudinal movement of the first section relative to the second section, where the second section includes a cart pivotably attached to the beam at a fulcrum, where the cart includes at least one wheel configured to roll along a floor of the cavity, where the cart is pivotable about the fulcrum to co-act with the height-variable member, where the second section is configured to move longitudinally relative to the first section by the cart rolling along the floor of the cavity.

The second section may further include a friction reducing pad adjacent the cart. Moving the second section longitudinally relative to the first section to the first trailer length may include: after the second section is inserted more than a first distance into the first section, the cart is in a first position in which the at least one wheel is in contact with the floor of the cavity and the height-variable member has a first thickness such that the friction reducing pad is not in contact with the floor of the cavity; and before the second section is inserted more than the first distance into the first section, the cart is pivoted to a second position in which the at least one wheel is in contact with the floor of the cavity and the height-variable member is compressed to have a second thickness smaller than the first thickness such that the friction reducing pad is in contact with the floor of the cavity.

Moving the second section longitudinally relative to the first section to the first trailer length may include: with the load experienced by the trailer below a threshold, the cart is in a first position in which the at least one wheel is in contact with the floor of the cavity and the height-variable member has a first thickness such that the friction reducing pad is not in contact with the floor of the cavity; and with the load experienced by the trailer above the threshold, the cart is pivoted to a second position in which the at least one wheel is in contact with the floor of the cavity and the height-variable member is compressed to have a second thickness smaller than the first thickness such that the friction reducing pad is in contact with the floor of the cavity.

The present disclosure also relates to the following clauses:

Clause 1: A trailer moveable by a cab, comprising: a first section comprising a cavity; and a second section comprising a beam at least partially positioned within the cavity and a height-variable member attached to the beam, wherein the second section is longitudinally movable relative to the first section, such that a length of the trailer is variable, wherein the second section comprises a cart pivotably attached to the beam at a fulcrum, wherein the cart comprises at least one wheel configured to roll along a floor of the cavity, wherein the cart is pivotable about the fulcrum to co-act with the height-variable member, wherein the second section is configured to move longitudinally relative to the first section by the cart rolling along the floor of the cavity.

Clause 2: The trailer of clause 1, wherein the height-variable member is configured to compress or decompress based on a load experienced by the trailer.

Clause 3: The trailer of clause 1 or 2, wherein the height-variable member comprises a deformable pad and/or a spring.

Clause 4: The trailer of clause 1, wherein the height-variable member comprises a hydraulic ram and/or a pneumatic airbag.

Clause 5: The trailer of any of clauses 1-4, wherein the second section further comprises a friction reducing pad adjacent the cart.

Clause 6: The trailer of clause 5, wherein the friction reducing pad comprises a plastic material.

Clause 7: The trailer of clause 6, wherein the plastic material comprises a self-lubricating plastic material.

Clause 8: The trailer of any of clauses 5-7, wherein the trailer is configured such that: with the load experienced by the trailer below a threshold, the cart is in a first position in which the at least one wheel is in contact with the floor of the cavity and the friction reducing pad is not in contact with the floor of the cavity; and with the load experienced by the trailer above the threshold, the cart is pivoted to a second position in which the at least one wheel is in contact with the floor of the cavity and the friction reducing pad is in contact with the floor of the cavity.

Clause 9: The trailer of any of clauses 5-8, wherein the trailer is configured such that: with the load experienced by the trailer below a threshold, the cart is in a first position in which the at least one wheel is in contact with the floor of the cavity and the height-variable member has a first thickness such that the friction reducing pad is not in contact with the floor of the cavity; and with the load experienced by the trailer above the threshold, the cart is pivoted to a second position in which the at least one wheel is in contact with the floor of the cavity and the height-variable member is compressed to have a second thickness smaller than the first thickness such that the friction reducing pad is in contact with the floor of the cavity.

Clause 10: The trailer of any of clauses 1-9, wherein the second section further comprises a contactable region adjacent the cart.

Clause 11: The trailer of clause 10, wherein the trailer is configured such that: with the load experienced by the trailer below a threshold, the cart is in a first position in which the at least one wheel is in contact with the floor of the cavity and the height-variable member has a first thickness such that the contactable region is not in contact with the floor of the cavity; and with the load experienced by the trailer above the threshold, the cart is pivoted to a second position in which the at least one wheel is in contact with the floor of the cavity and the height-variable member is compressed to have a second thickness smaller than the first thickness such that the contactable region is in contact with the floor of the cavity.

Clause 12: The trailer of any of clauses 5-11, wherein the height-variable member is attached to a top side of the beam and the friction reducing pad is attached to an opposing bottom side of the beam.

Clause 13: The trailer of any of clauses 1-12, wherein the cart is arranged on a first end of the beam which first engages the cavity, wherein the cart further comprises a shield arranged on the first end of the beam at a height configured to clear debris from the floor of the cavity when the cart is rolled along the floor of the cavity.

Clause 14: The trailer of any of clauses 1-13, wherein the trailer comprises a low boy trailer.

Clause 15: The trailer of any of clauses 1-14, wherein the first section comprises a front end defining a front cavity and a rear end defining a rear cavity; wherein the second section is at least partially positioned within the front cavity; wherein the trailer further comprises a third section at least partially positioned within the rear cavity, wherein the third section is longitudinally movable relative to the first section, such that a length of the trailer is variable, wherein the third section comprises a second beam at least partially positioned within the rear cavity and a second height-variable member attached to the second beam, wherein the third section comprises a second cart pivotably attached to the second beam at a second fulcrum, wherein the second cart comprises at least one second wheel configured to roll along a floor of the rear cavity, wherein the second cart is pivotable about the second fulcrum to co-act with the second height-variable member, wherein the third section is configured to move longitudinally relative to the first section by the second cart rolling along the floor of the rear cavity.

Clause 16: A towing system, comprising: a cab; and the trailer of any of clauses 1-15 connected to the cab.

Clause 17: A method for adjusting a length of a trailer, such as the trailer of any of clauses 1-15, moveable by a cab, comprising: providing a first section of the trailer, the first section comprising a cavity; inserting a second section of the trailer into the cavity and moving the second section longitudinally relative to the first section to a first trailer length; and fixing the trailer at the first trailer length by restricting longitudinal movement of the first section relative to the second section, wherein the second section comprises a cart pivotably attached to the beam at a fulcrum, wherein the cart comprises at least one wheel configured to roll along a floor of the cavity, wherein the cart is pivotable about the fulcrum to co-act with the height-variable member, wherein the second section is configured to move longitudinally relative to the first section by the cart rolling along the floor of the cavity.

Clause 18: The method of clause 17, wherein the second section further comprises a friction reducing pad adjacent the cart.

Clause 19: The method of clause 18, wherein moving the second section longitudinally relative to the first section to the first trailer length comprises: after the second section is inserted more than a first distance into the first section, the cart is in a first position in which the at least one wheel is in contact with the floor of the cavity and the height-variable member has a first thickness such that the friction reducing pad is not in contact with the floor of the cavity; and before the second section is inserted more than the first distance into the first section, the cart is pivoted to a second position in which the at least one wheel is in contact with the floor of the cavity and the height-variable member is compressed to have a second thickness smaller than the first thickness such that the friction reducing pad is in contact with the floor of the cavity.

Clause 20: The method of clause 18 or 19, wherein moving the second section longitudinally relative to the first section to the first trailer length comprises: with the load experienced by the trailer below a threshold, the cart is in a first position in which the at least one wheel is in contact with the floor of the cavity and the height-variable member has a first thickness such that the friction reducing pad is not in contact with the floor of the cavity; and with the load experienced by the trailer above the threshold, the cart is pivoted to a second position in which the at least one wheel is in contact with the floor of the cavity and the height-variable member is compressed to have a second thickness smaller than the first thickness such that the friction reducing pad is in contact with the floor of the cavity.

6

Figure 7:
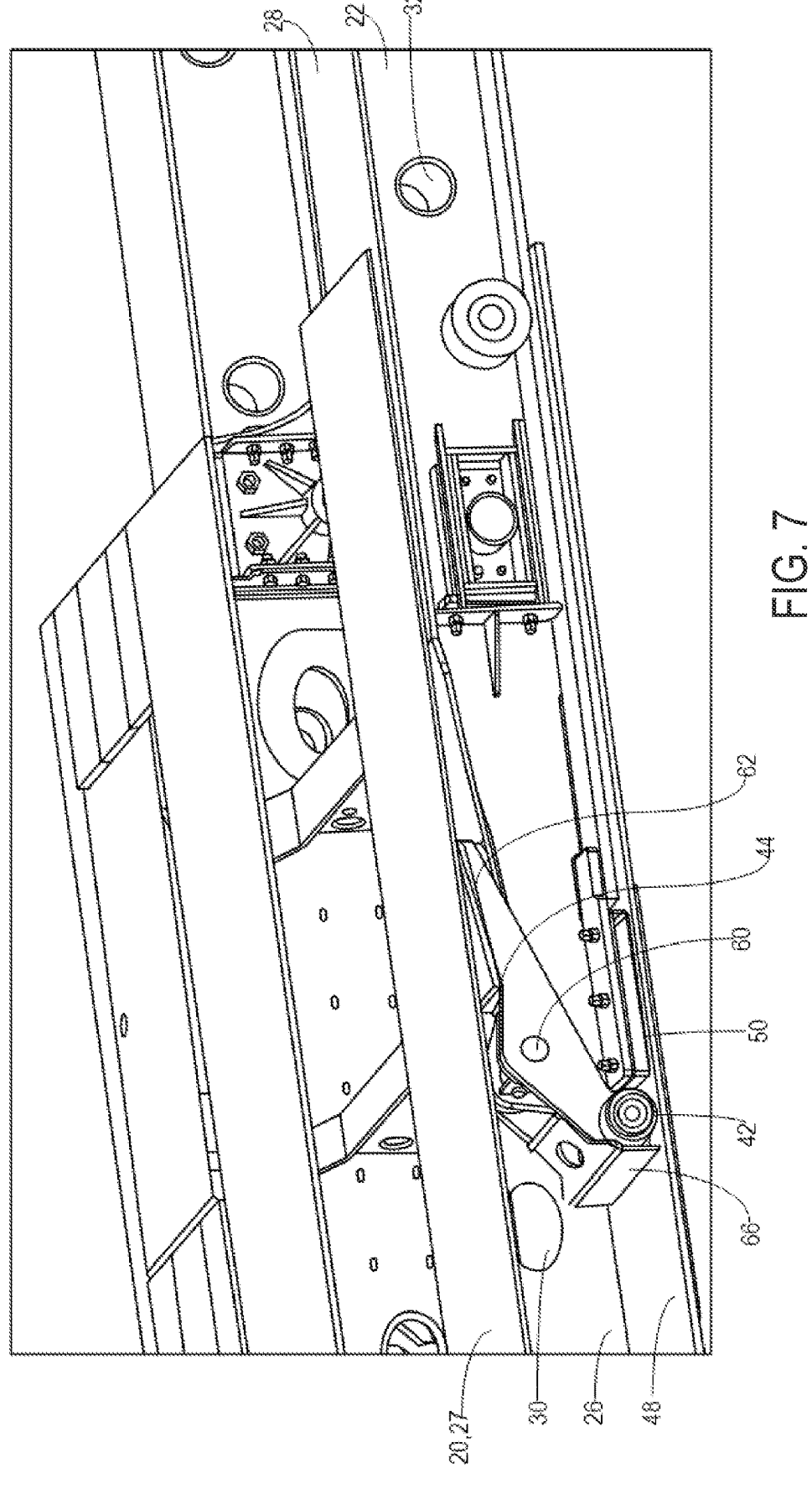
Figure 9:
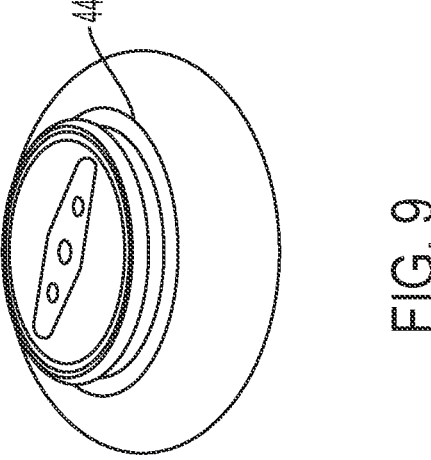
Figure 8:
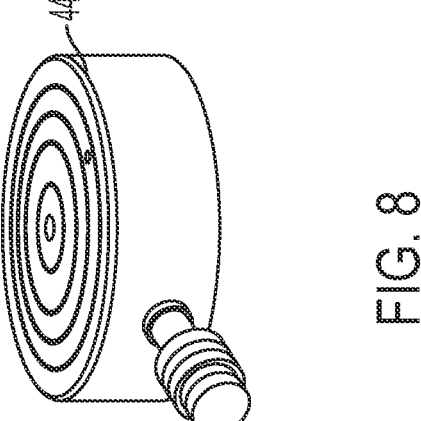
Figure 10:
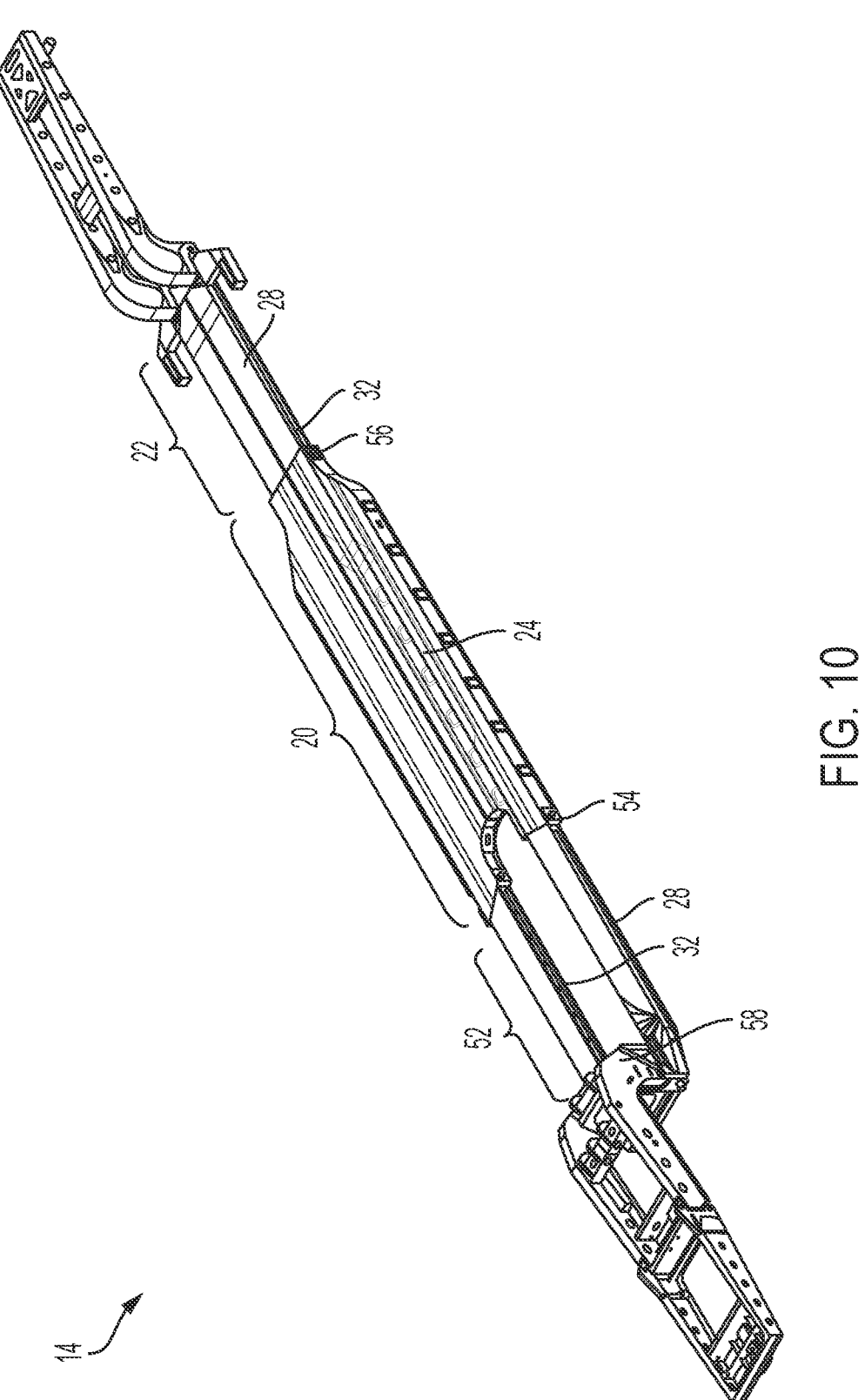
Figure 11:
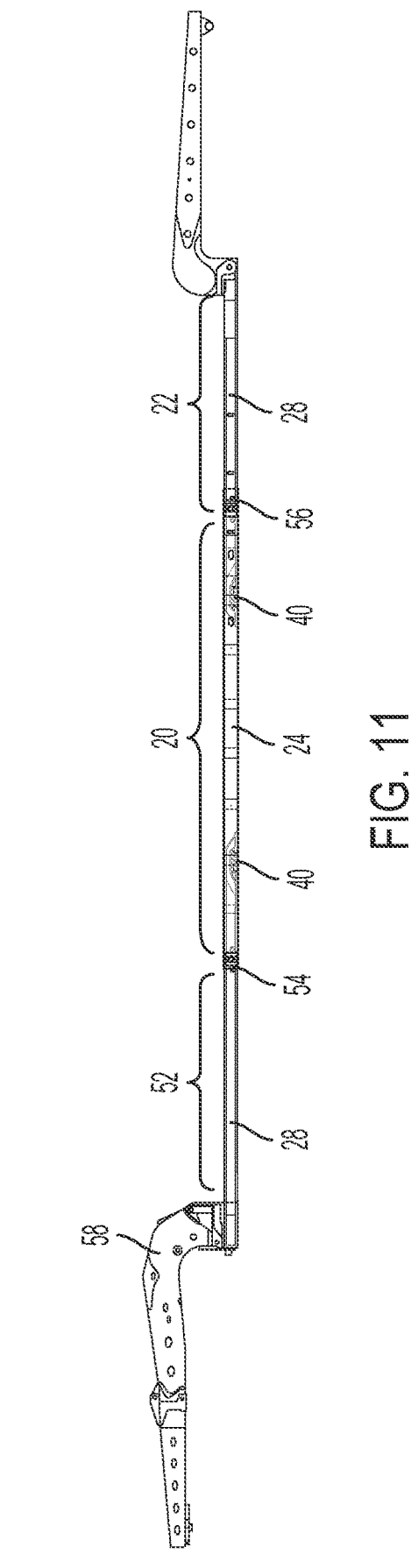

FIG. 7 shows a cutaway perspective view of a trailer having the first section and second section engaged according to non-limiting embodiments or aspects of the present disclosure;

FIG. 8 shows a perspective view of a height-variable member in the form of a hydraulic ram according to non-limiting embodiments or aspects of the present disclosure;

FIG. 9 shows a perspective view of a height-variable member in the form of a pneumatic airbag according to non-limiting embodiments or aspects of the present disclosure;

FIG. 10 shows a perspective view of a double stretch lowboy trailer according to the present disclosure; and FIG. 11 shows a side view of a double stretch lowboy trailer according to the present disclosure.

DETAILED DESCRIPTION

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." For example, "a beam" or "a cavity" means "at least one beam" or "at least one cavity".

The present disclosure is directed to a trailer moveable by a cab, the trailer including a first section comprising a cavity; and a second section comprising a beam at least partially positioned within the cavity and a height-variable member attached to the beam, wherein the second section is longitudinally movable relative to the first section, such that a length of the trailer is variable, wherein the second section comprises a cart pivotably attached to the beam at a fulcrum, wherein the cart comprises at least one wheel configured to roll along a floor of the cavity, wherein the cart is pivotable about the fulcrum to co-act with the height-variable member, wherein the second section is configured to move longitudinally relative to the first section by the cart rolling along the floor of the cavity.

The present disclosure is also directed to a towing system including a cab connected to the trailer described herein.

The present disclosure is also directed to a method for adjusting a length of a trailer moveable by a cab, the method including: providing a first section of the trailer, the first section comprising a cavity; inserting a second section of the trailer into the cavity and moving the second section longitudinally relative to the first section to a first trailer length; and fixing the trailer at the first trailer length by restricting longitudinal movement of the first section relative to the second section, wherein the second section comprises a cart pivotably attached to the beam at a fulcrum, wherein the cart comprises at least one wheel configured to roll along a floor of the cavity, wherein the cart is pivotable about the fulcrum to co-act with the height-variable member, wherein the second section is configured to move longitudinally relative to the first section by the cart rolling along the floor of the cavity.

Figure 1:
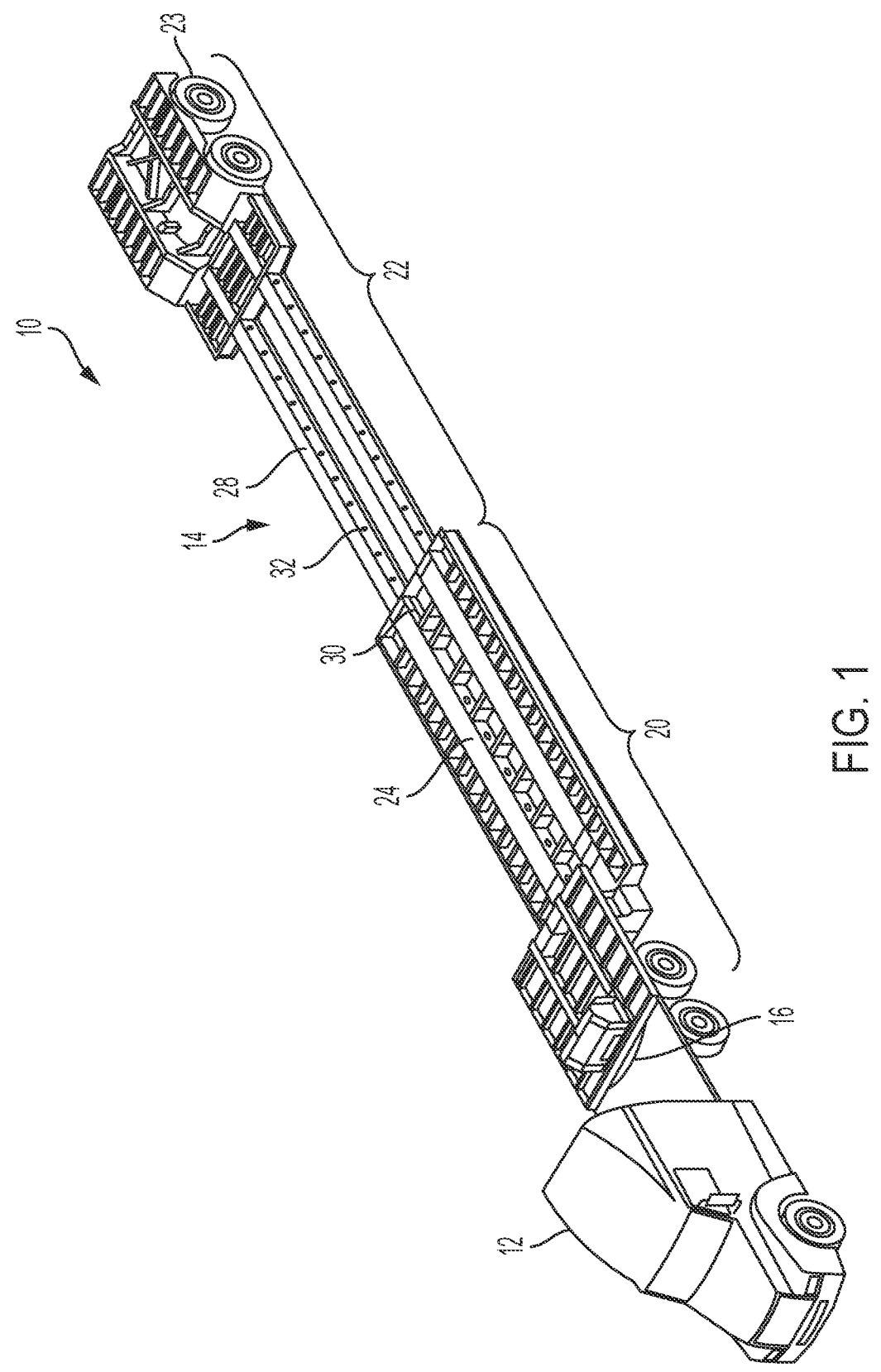
FIG. 1 shows a perspective view of a towing system according to non-limiting embodiments or aspects of the present disclosure.
Figure 2:
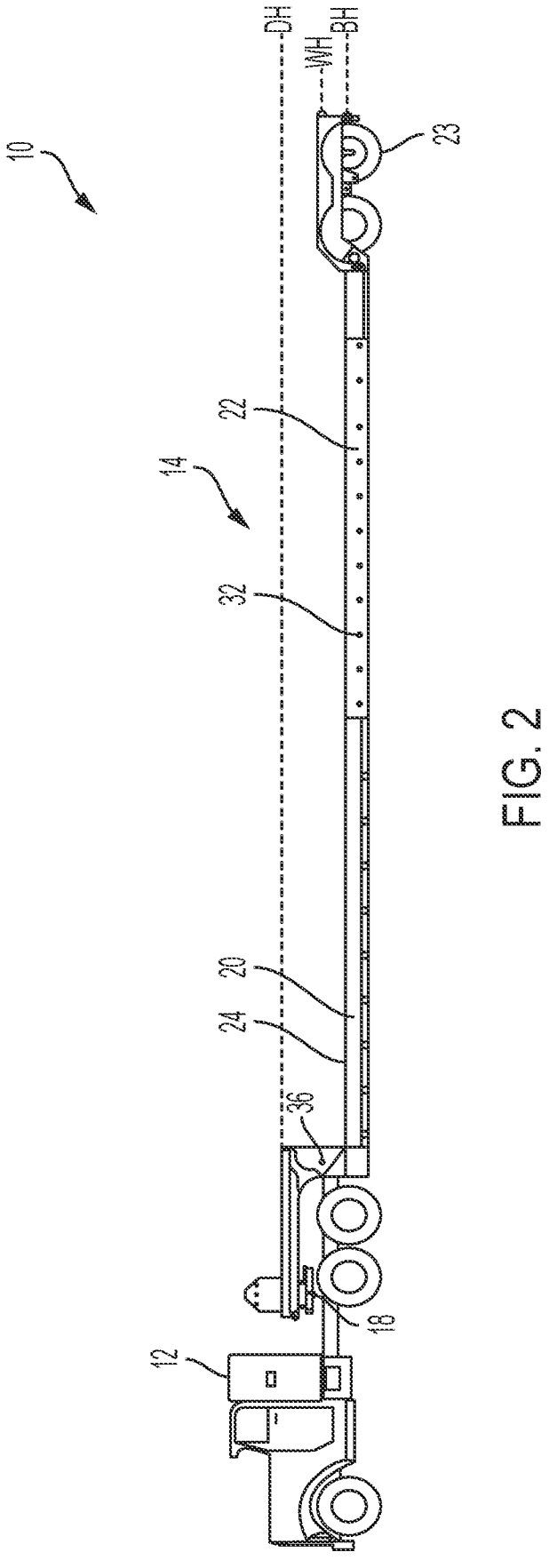
FIG. 2 shows a side view of the towing system of FIG. 1.
Figure 3A:
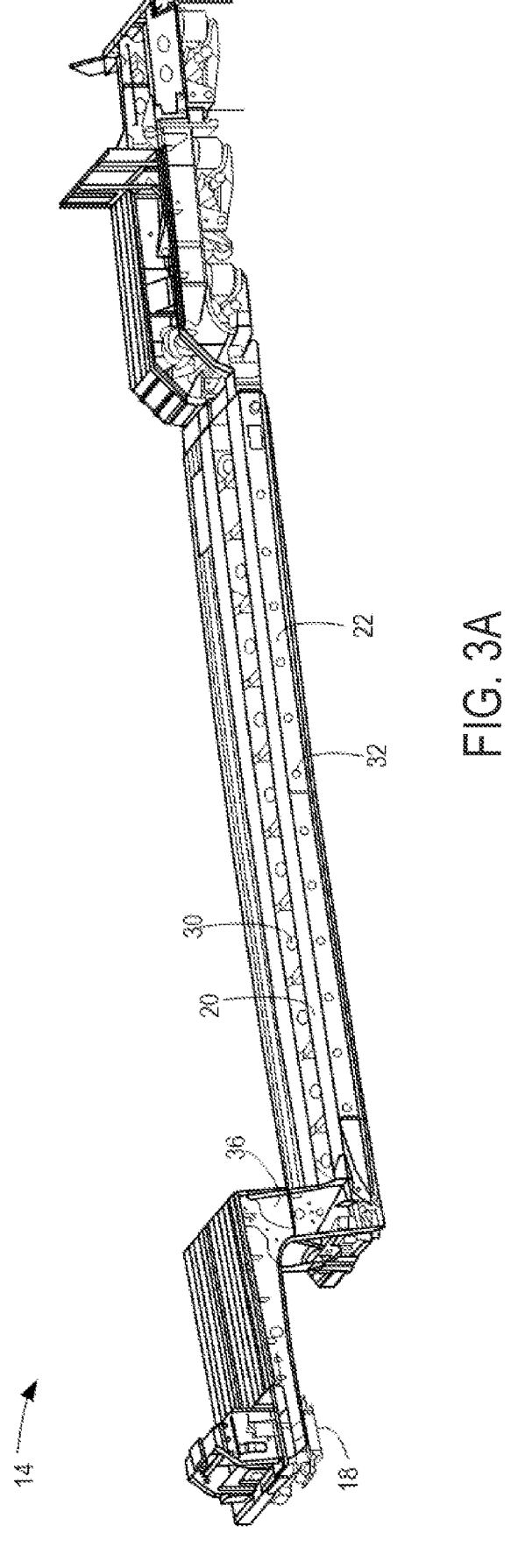
FIG. 3A shows a cut-away perspective view of a stretch trailer in the fully closed position according to non-limiting embodiments or aspects of the present disclosure.
Figure 3B:
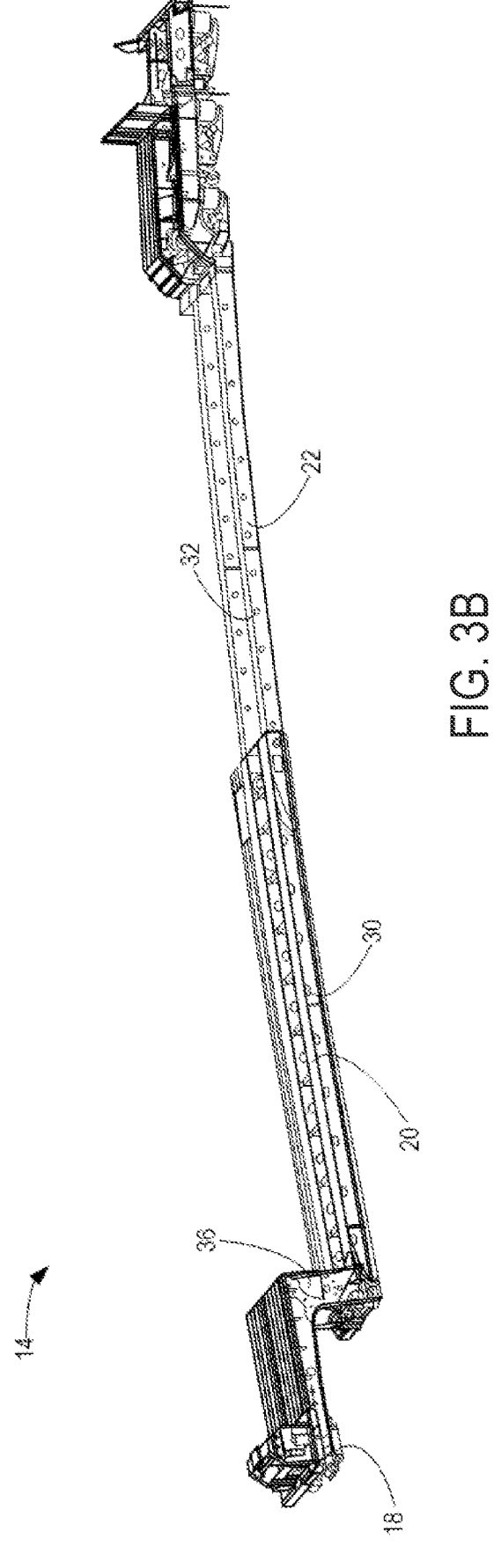
FIG. 3B shows a cut-away perspective view of a stretch trailer in the fully extended position according to non-limiting embodiments or aspects of the present disclosure.
Figure 4:
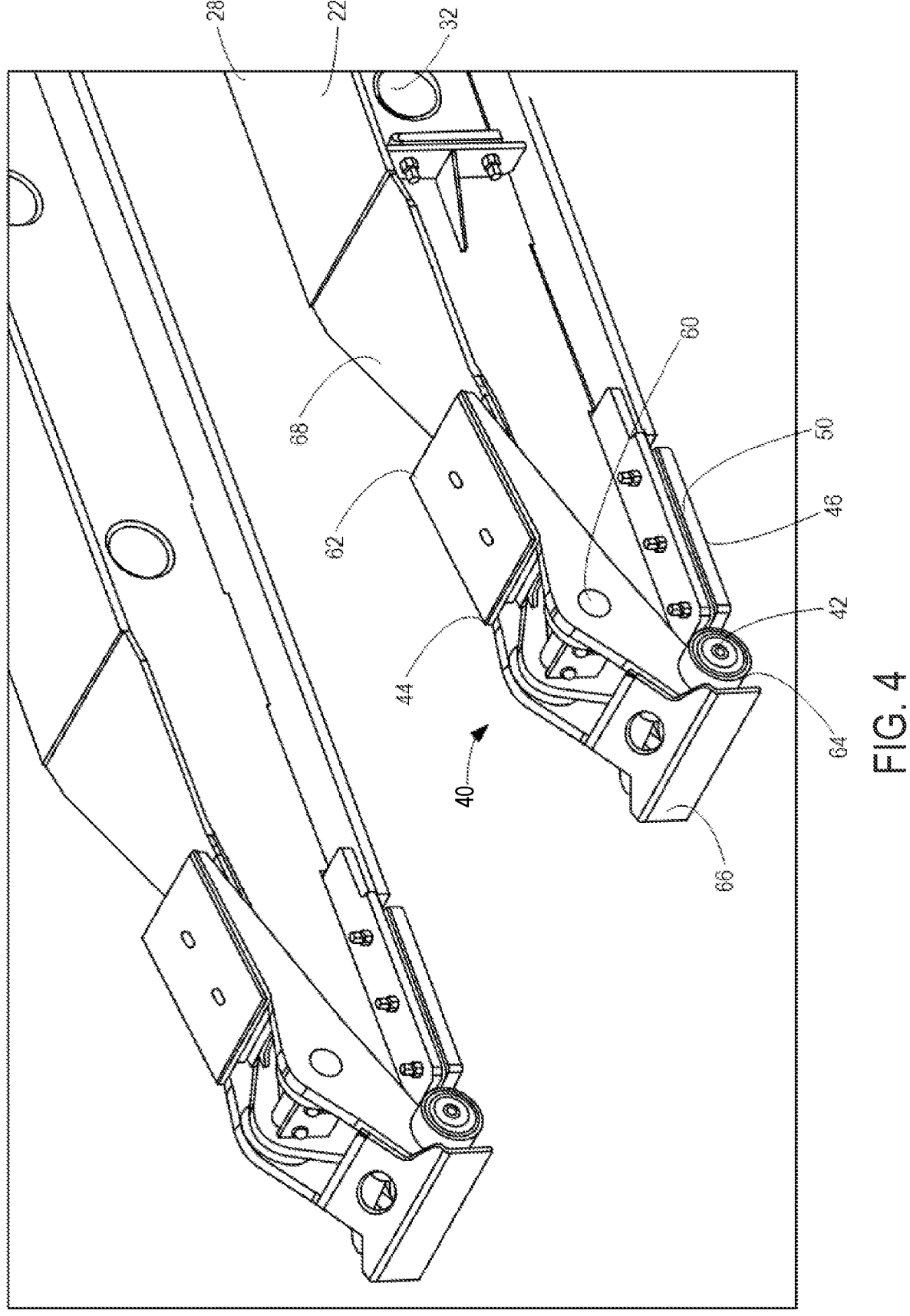
FIG. 4 shows a perspective view of a second section of a trailer including a cart and a friction reducing pad according to non-limiting embodiments or aspects of the present disclosure.
Figure 5:
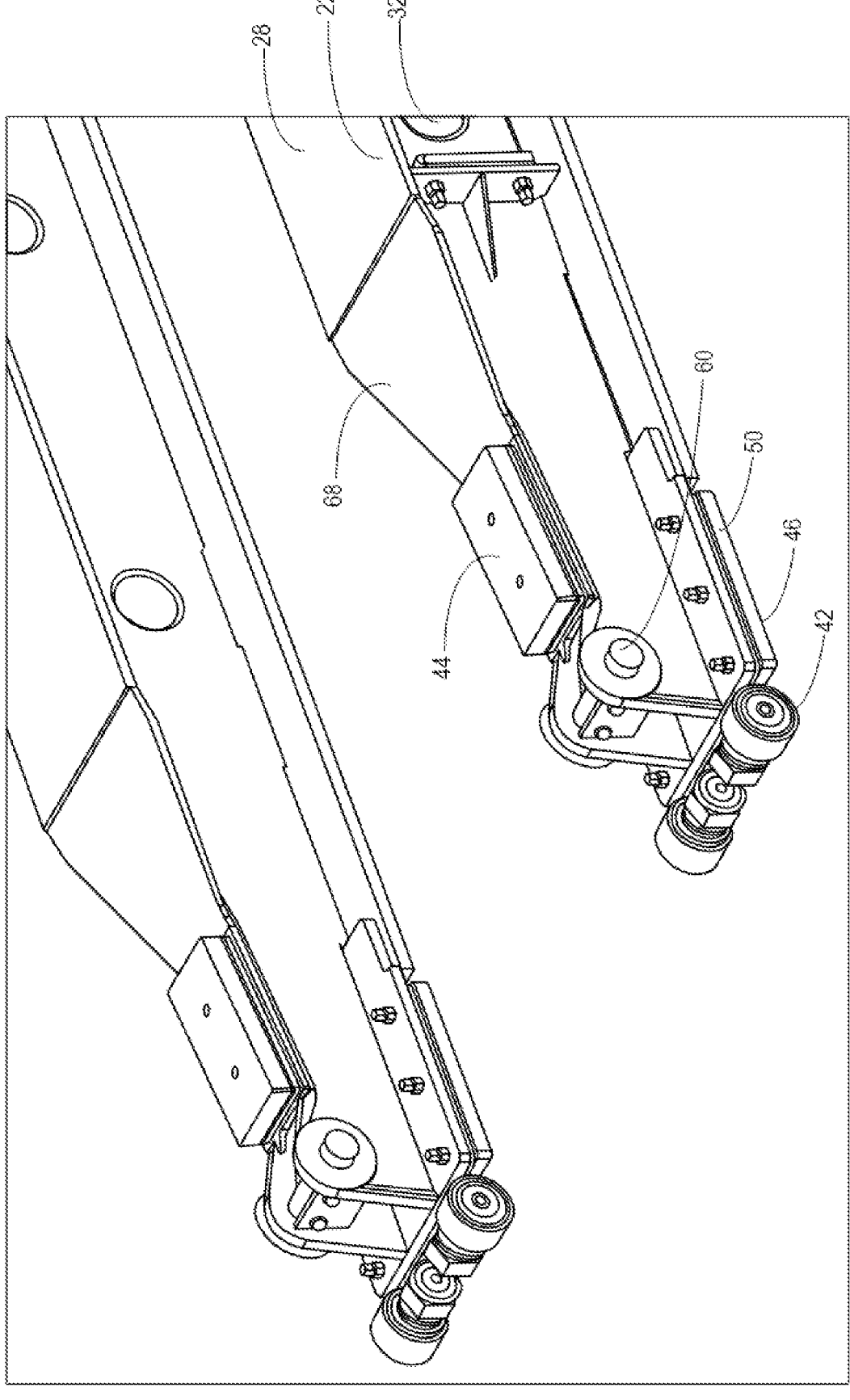
FIG. 5 shows a perspective view of the second section of FIG. 4 with the cart (except the wheels) removed.
Figure 6:
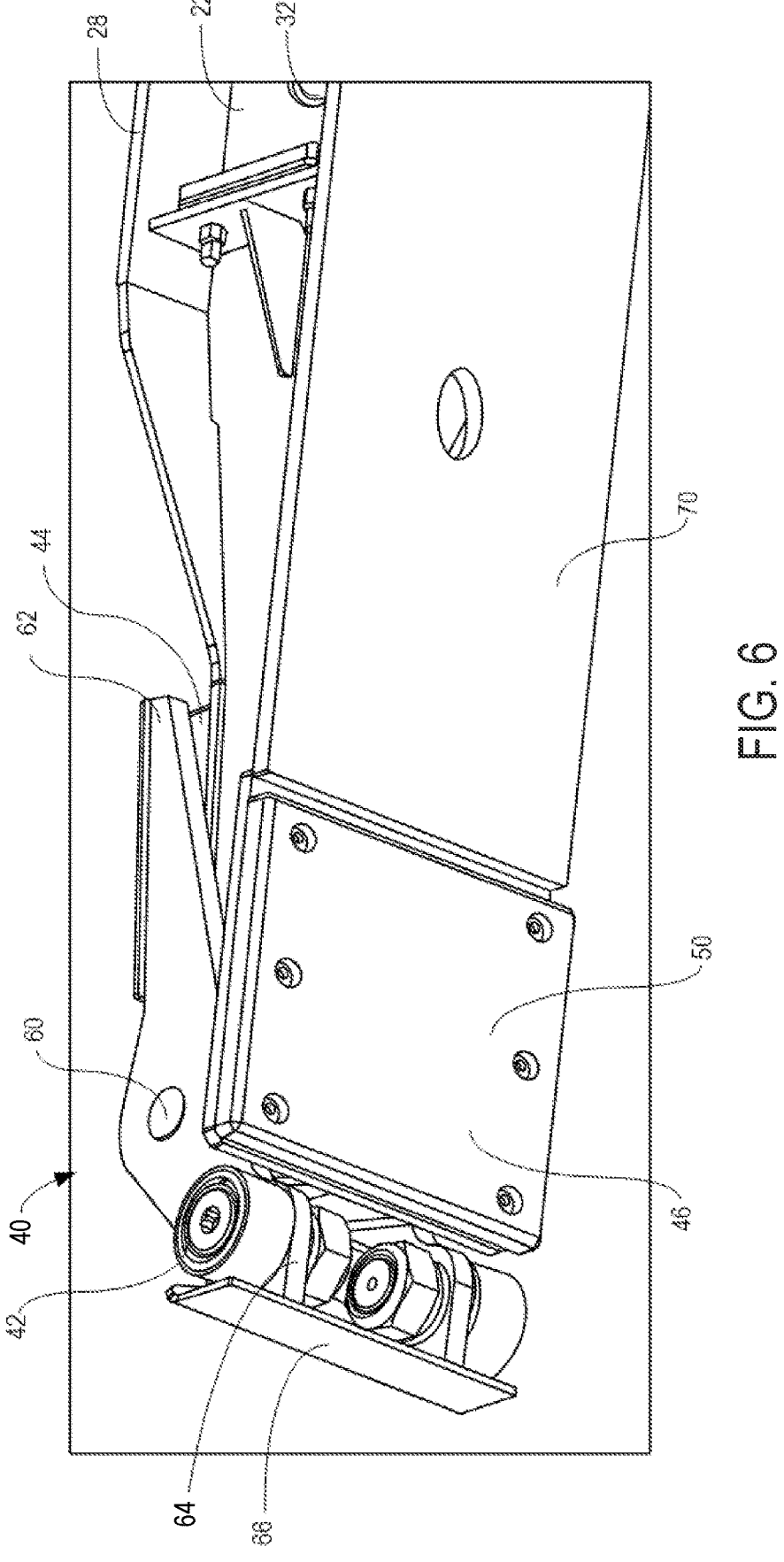
FIG. 6 shows a perspective view of a bottom of the second section of FIG. 4.

Referring to FIGS. 1 and 2 a towing system 10 is shown which includes a cab 12 and a trailer 14 attached to the cab 12. The cab 12 may include a truck having an engine. The cab 12 may be configured to pull the connected trailer 14. The towing system 10 may be configured to haul a load by placing a load on the trailer 14 and pulling the trailer 14 including the load with the cab 12. The cab 12 may include a fifth wheel 16, and the trailer may include a king pin 18, such that engaging the king pin 18 with the fifth wheel 16 enables the cab 12 to pull the trailer 14. However, other mechanisms known in the art for connecting the cab 12 and the trailer 14 to form a towing system 10 may be used.

Referring to FIGS. 1-3B and 7, the trailer 14 may include a first section 20 and a second section 22. The trailer 14 may include wheels 23 to enable the trailer 14 to be moved (e.g., pulled by the cab 12). The first section 20 may include a bed 24 comprising a housing 27 defining a cavity 26. The bed 24 may define a plurality of cavities 26 in some non-limiting examples on one or both ends of the bed 24. The second section 22 may be at least partially positionable within the cavity 26 and may be longitudinally movable relative to the first section 20, such that a length of the trailer 14 is variable (e.g., the trailer is a stretch trailer). The second section 22 may include a beam (a self-supporting member) 28 that may be positionable within the cavity 26, although other arrangements of the second section 22 may be used to enable the second section 22 to be at least partially positionable within the cavity 26. In the non-limiting example shown in FIGS. 1 and 7, two beams 28 of the second section 22 are positioned within two cavities 26 of the first section 20, although any number of beams 28 and/or cavities 26 or any arrangement of the first section 20 and the second section 22 may be used.

The second section 22 may be longitudinally movable relative to the first section 20 in a telescoping arrangement. The beam 28 of the second section 22 may telescope within the cavity 26 of the first section 20 to vary the length of the trailer 14. However, other arrangements that enable the first section 20 and the second section 22 of the trailer 14 to be longitudinally movable relative to one another to form a stretch trailer may be used.

With continued reference to 1-3B and 7, the trailer 14 may be fixed at a first length. The fixed trailer 14 may restrict and/or prohibit longitudinal movement of the first section 20 relative to the second section 22 to fix the length of the trailer 14. The trailer 14 may be fixed in length by pinning or any other suitable fixing mechanism. The first section 20 may include at least one pin hole 30, and the second section 22 may include at least one pin hole 32. A pin (not shown) may be inserted through the pin holes 30, 32 of the first and second sections 20, 22 to fix the length of the trailer 14. A plurality of pin holes 30, 32 may be included in the first and/or second sections 20, 22 to enable the trailer 14 to be fixed at a plurality of different lengths, depending on the pin holes 30, 32 aligned and pinned by the pin.

Referring to FIG. 2, the trailer 14 may include a low boy trailer. The low boy trailer 14 may include at least one gooseneck 36 to define a plurality of levels of the trailer 14. The trailer 14 may have a deck height (DH) at which the trailer 14 is attached to the cab 12. The trailer 14 may have a bed height (BH) at which the bed 24 of the first section 20 of the trailer 14 is positioned. The gooseneck 36 may connect the deck to the bed 24, such that the gooseneck 36 may define the distance between DH and BH. BH may be lower to the ground than DH in a low boy trailer (the bed 24 may be lower than the deck). The trailer 14 may have a wheel height (WH) corresponding to the height of the trailer 24 at the rear wheels. BH may be lower to the ground than WH in a low boy trailer (the bed 24 may be lower than the height of the trailer at the wheels 23). While the trailer 14 in FIGS. 1-3B, 10, and 11 shows a low boy trailer, it will be appreciated that other styles of trailer may be included in the present disclosure.

Referring to FIGS. 4-7, the second section 22 may include a cart 40. The cart 40 may include at least one wheel 42. The number of wheels on the cart 40 may depend on the load capacity to be supported by the trailer 14. In the examples of FIGS. 4-7, the cart 40 includes 2 wheels; however, any suitable number of wheels 42 may be included on the cart 40. The wheel 42 may be configured to roll along a floor 48 of the cavity 26 when the first section 20 and the second section 22 are engaged. The second section 22 may be configured to move longitudinally relative to the first section 20 by the wheel 42 of the cart 40 rolling along the floor 48 of the cavity 26.

The cart 40 may comprise a first end 62 and a second end 64 and may be pivotably attached to the beam 28 at a fulcrum 60, such that the cart 40 may rotate about the fulcrum 60. The wheel 42 may be arranged at the second end 64 of the cart 40. The cart 40 may be pivotable about the fulcrum 60 to co-act with the height-variable member 44 to adjust the vertical height of the wheel 42 relative to the floor 48 of the cavity 26.

The height-variable member 44 may be attached to the beam 28. The height-variable member 44 may be attached to a top side 68 of the beam 28. The height-variable member 44 may co-act with the cart 40 by the first end 62 of the cart 40 engaging with the height-variable member 44. For example, as shown in FIGS. 4-7, reduction in the height (compression) of the height-variable member 44 may be caused by lowering of the first end 62 and raising of the second end 64 of the cart 40 (based on the load experienced by the trailer 14), while increase in the height (decompression) of the height-variable member 44 may be caused by raising of the first end 62 and lowering of the second end 64 of the cart 40 (based on the load experienced by the trailer 14). The raising and lowering of the second end 64 of the cart 40 may ease or inhibit longitudinal movement of the second section 22 relative to the first section 20 as described hereinafter. The co-action of the first end 62 against the height-variable member 44 may compress or decompress the height-variable member 44.

The height-variable member 44 may be configured to change height (e.g., thickness) to enable the wheels 42 of the cart 40 and the later described contactable region 46 to be in contact with the floor 48 of the cavity 26 or only the wheels 42 of the cart 40 to be in contact with the floor 48 of the cavity 26. The height-variable member 44 may be configured to compress or decompress based on a load experienced by the trailer 14 (e.g., change height/thickness by compressing or decompressing). The height-variable member 44 may be configured to change height/thickness based on user input to the height-variable member 44 (as described hereinafter).

The height-variable member 44 may be configured to compress or decompress based on a load experienced by the trailer 14 (e.g., change height/thickness by compressing or decompressing). Such a height-variable member 44 may include a deformable pad configured to compress or decompress. The deformable pad may include rubber pad or a pad made of some other resilient (compressible and/or decompressible) material which compresses/decompresses based on a load experienced by the trailer 14. The height-variable member 44 may include a spring which compresses/decompresses based on a load experienced by the trailer 14.

The height-variable member 44 may be configured to change height/thickness based on user input to the height-variable member 44. Such a height-variable member 44 may comprise a hydraulic ram as shown in FIG. 8. The user may cause hydraulic fluid to be flowed into or out of the hydraulic ram to cause the height/thickness of the hydraulic ram to be the desired height/thickness. For example, the user may cause hydraulic fluid to flow into the hydraulic ram to cause the height/thickness of the hydraulic ram to increase. For example, the user may cause hydraulic fluid to flow out of the hydraulic ram to cause (e.g., via a controller) the height/thickness of the hydraulic ram to decrease.

The height-variable member 44 may be configured to change height/thickness based on user input to the height-variable member 44. Such a height-variable member 44 may comprise a pneumatic airbag as shown in FIG. 9. The user may cause gas, such as air, to flow into or out of the pneumatic airbag to cause the height/thickness of the pneumatic airbag to be the desired height/thickness. For example, the user may cause gas to flow into the pneumatic airbag to cause the height/thickness of the pneumatic airbag to increase. For example, the user may cause gas to flow out of the pneumatic airbag to cause (e.g., via a controller) the height/thickness of the pneumatic airbag to decrease.

With continued reference to FIGS. 4-7, the second section 22 may include a contactable region 46 adjacent to the cart 40. The cart 40 may be positioned closer to the end of the second section 22 to be arranged closer to the cab 12 (when attached thereto) compared to the contactable region 46. The contactable region 46 may be attached to an opposing (compared to the height-variable member 44) bottom side 70 of the beam 28.

The second section 22 may comprise the beam 28, and the cart 40 (e.g., the wheels 42 thereof) and the contactable region 46 may be attached to the beam 28. The cart 40 may be arranged closer to an end of the beam 28 which first engages the cavity 26 of the first section 20 compared to the contactable region 46. The cart 40 may comprise a shield 66 arranged on the end of the beam 28 which first engages the cavity 26. The shield 66 may be arranged at a height, relative to the floor 48 of the cavity 26, to clear debris from the floor 48 of the cavity 26 when the cart 40 is rolled along the floor 48 of the cavity 26, such as during the engagement of the first section 20 and the second section 22. The shield 66 may be arranged at a higher height than the lowest level of the wheels 42 so that the shield 66 does not hinder longitudinal movement of the cart 40.

The contactable region 46 may be made of the same material as the beam 28 of the second section 22 or may be made of a different material therefrom. The contactable region 46 may be configured to contact the floor 48 of the cavity 26 in certain arrangements and may be configured to not be in contact with the floor 48 of the cavity 26 in other arrangements, for example, depending on the load experienced by the trailer 14. When no load is experienced by the trailer 14, the contactable region 46 may be arranged to be at a higher lowest level compared to the lowest level of the wheel 42 of the cart 40.

With continued reference to FIGS. 4-7, the wheel 42 of the cart 40 may be positioned to contact and run along the floor 48 of the cavity 26 (when the first section 20 and the second section 22 are engaged). Compression of the height-variable member 44 by the first end 62 of the cart 40 co-acting (exerting a force) on the height-variable member 44 (by the cart 40 being rotatably pushed by the floor 48) may enable the level of the wheel 42 to be moved up while the level of the contactable region 46 is moved down, relatively. The various interactions between the wheel 42, the height-variable member 44, and the contactable region 46 will be described hereinafter. Contact of both the wheel 42 and the contactable region 46 with the floor 48 enables easier longitudinal movement of the second section 22 relative to the first section 20, while contact of the wheel 42 and not the contactable region 46 makes longitudinal movement of the second section 22 relative to the first section 20 more challenging.

Prior to assembly of the trailer 14, the first section 20 and the second section 22 may be in a disengaged position. In the disengaged position, the wheels 42 are not in contact with the floor 48 of the cavity 26, and no force is being exerted on the wheels 42 of the cart 40 toward the height-variable member 44 (by pivoting of the cart 40). The lowest level of the wheel 42 is lower than the lowest level of the contactable region 46.

When the first section 20 and the second section 22 are engaged with one another, with a load experienced by the trailer 14 below a threshold, the cart 40 may be in a first position in which the wheel 42 is in contact with the floor 48 of the cavity 26 and the contactable region 46 may not be in contact with the floor 48 of the cavity 26. This may be because the force experienced by the trailer 14 is not sufficient to compress the height-variable member 44 (by rotating the wheels 42 upward toward the height-variable member 44 to cause the first end 62 of the cart 40 to push against the height-variable member 44) to the extent that the contactable region 46 would be lowered enough for the contactable region 46 to contact the floor 48 of the cavity 26. In this situation, the height-variable member 44 may have a first thickness. The load may be below the threshold when a load above a specific mass is not on the trailer 14 and/or a load is not arranged at a specific position or arrangement on the trailer 14 to cause the load to exceed the threshold. The load may be below the threshold after the second section 22 is inserted more than a first distance into the first section 20, as the load on the trailer 14 may decrease as the second section 22 is inserted further into the first section 20.

Referring to FIG. 7, when the first section 20 and the second section 22 are engaged with one another, with a load experienced by the trailer 14 above the threshold, the cart 40 is pivoted to a second position in which the wheel 42 may be in contact with the floor 48 of the cavity 26 and the contactable region 46 may also be in contact with the floor 48 of the cavity 26. This may be because the force experienced by the trailer 14 is sufficient to compress the height-variable member 44 (by rotating the cart 40 such that the first end 62 compresses the height-variable member 44) to the extent that the contactable region 46 would be lowered enough for the contactable region 46 to contact the floor 48 of the cavity 26 at the same time as the wheels 42. In this situation, the height-variable member 44 may have a second thickness smaller than the first thickness by compression. The load may be above the threshold when a load above a specific mass is on the trailer 14 and/or a load is arranged at a specific position or arrangement on the trailer 14 to cause the load to exceed the threshold. The load may be above the threshold before the second section 22 is inserted more than a first distance into the first section 20, as the load on the trailer 14 may decrease as the second section 22 is inserted further into the first section 20.

In this way, the co-action between the cart 40 (e.g., the wheels 42), the height-variable member 44, and the contactable region 46 (based on the load experienced by the trailer 14) may cause at least one of the wheels 42 and the contactable region 46 to be in contact with the floor 48 of the cavity 26. In situations in which the trailer 14 is experiencing a higher load, arranging the trailer 14 so that the wheel 42 and the contactable region 46 are both contacting the floor 48 of the cavity 26 may cause the longitudinal movement between the first section 20 and the second section 22 to be effected more easily by a user. Both the wheel 42 and the contactable region 46 in contact with the floor 48 of the cavity 26 may spread the stress experienced by the cart 40 (and the wheel 42 thereof) over a larger area. With only the wheel 42 in contact with the floor 48 of the cavity 26, the wheel 42 may experience a high force, which may damage the wheel 42. Additionally, the wheel 42 may act as a point contact on the floor 48 of the cavity 26, which may create a local stress on the floor 48 to cause the floor 48 to be damaged. Spreading the force over the wheel 42 and the contactable region 46 may result in less force on the various components, avoiding and/or delaying the above-described potential damage.

Referring to FIGS. 1-3B and 7, the trailer 14 is shown with the first section 20 comprising the cavity 26 being arranged as the front section of the trailer 14 and the second section 22 comprising the cart 40 and contactable region 46 being positioned as the rear section of the trailer 14. However, it will be appreciated that this arrangement may be reversed, with the first section 20 comprising the cavity 26 being arranged as the rear section of the trailer 14 and the second section 22 comprising the cart 40 and contactable region 46 being positioned as the front section of the trailer 14.

Referring again to FIGS. 4-7, the second section 22 may include a friction reducing pad 50 adjacent the cart 40. The friction reducing pad 50 may function as the contactable region 46. The friction reducing pad 50 may be made of a material that has a lower coefficient of friction (e.g., compared to the material of the beam 28 of the second section 22) with the floor 48 of the cavity 26 when the first section 20 and the second section 22 are engaged and moved longitudinally relative to one another. For example, the beam 28 may be a metal material (e.g., steel), while the friction reducing pad 50 may be non-metallic and may have a comparatively lower coefficient of friction with the floor 48 of the cavity 26. The friction reducing pad 50 may include a plastic material. The plastic material may include a self-lubricating plastic material. A non-limiting example a self-lubricating plastic that may be used as the friction reducing pad 50 is NYLOIL (e.g., a cast nylon material with built-in oil lubrication), available from Arlo Steel (Jackson, MI). However it will be appreciated that other friction reducing materials may be used as the friction reducing pad 50. The friction reducing pad 50 may be arranged and/or function in the same way as the contactable region 46 (and may be the contactable region 46) as described above.

Referring to FIGS. 3A-7, a method for adjusting a length of the trailer 14 includes providing the first section 20 of the trailer 14, the first section 20 comprising the cavity 26. The second section 22 may be inserted into the cavity 26, and the second section 22 may be moved longitudinally relative to the first section 20 to the desired first length of the trailer 14. The first section 20 may be fixed relative to the second section 22. For example, the pin may be inserted through the pin holes 30, 32 to pin the trailer 14 to fix the trailer 14 at the first trailer length by restricting and/or prohibiting further longitudinal movement of the first section relative 20 to the second section 22. The wheel 42 of the cart 40 may be configured to roll along the floor 48 of the cavity 26 to move the second section 22 relative to the first section 20. The height-variable member 44 may compress or decompress based on a load experienced by the trailer 14 and/or user input to bring the contactable region 46 (and/or the friction reducing pad 50) into or out of contact with the floor 48.

Moving the second section 22 longitudinally relative to the first section 20 to a first trailer length may include, after the second section 22 is inserted more than a first distance into the first section 20, the wheel 42 of the cart 40 may be in contact with the floor 48 of the cavity 26 and the height-variable member 44 may have a first thickness such that the contactable region 46 is not in contact with the floor 48 of the cavity 26. The first thickness may be achieved based on the load experienced by the trailer causing the height-variable member 44 to automatically conform to the first thickness based on material properties of the height-variable member 44 and/or the first thickness may be achieved by a user causing the height-variable member 44 to have the first thickness (e.g., by adding or removing hydraulic fluid or gas thereto in the case of the hydraulic ram or pneumatic airbag). Moving the second section 22 longitudinally relative to the first section 20 to a first trailer length may include, before the second section 22 is inserted more than the first distance into the first section 20, the wheel 42 of the cart 40 may be in contact with the floor 48 of the cavity 26 and the height-variable member 44 may have a second thickness smaller than the first thickness such that the contactable region 46 is also in contact with the floor 48 of the cavity 26. The second thickness may be achieved based on the load experienced by the trailer causing the height-variable member 44 to automatically conform to the second thickness based on material properties of the height-variable member 44 and/or the second thickness may be achieved by a user causing the height-variable member 44 to have the second thickness (e.g., by adding or removing hydraulic oil or gas thereto in the case of the hydraulic ram or pneumatic airbag).

Moving the second section 22 longitudinally relative to the first section 20 to a first trailer length may include, with the load experienced by the trailer 14 below a threshold, the wheel 42 of the cart 40 may be in contact with the floor 48 of the cavity 26 and the height-variable member 44 may have a first thickness such that the contactable region 46 is not in contact with the floor 48 of the cavity 26. Moving the second section 22 longitudinally relative to the first section 20 to a first trailer length may include, with the load experienced by the trailer 14 above the threshold, the wheel 42 of the cart 40 may be in contact with the floor 48 of the cavity 26 and the height-variable member 44 may have a second thickness smaller than the first thickness such that the contactable region 46 is also in contact with the floor 48 of the cavity 26.

Referring again to FIGS. 1-3B, the trailer 14 shown and described comprises a first section 20 and a second section 22 to form a single stretch trailer 14 where the second section 22 moves longitudinally relative to the first section 20 to adjust the length of the trailer 14. Referring to FIGS. 10-11, the trailer 14 may comprise a first section 20 and second section 22 as described in connection with FIGS. 1-3B, but may additionally comprise a third section 52 configured to move longitudinally relative to the first section 20 to adjust the length of the trailer 14 in a second direction. Thus, the trailer 14 from FIGS. 10-11 illustrates a double stretch trailer in which the second section 22 and/or the third section 52 may be moved relative to the first section 20 to adjust the length of the trailer 14.

With continued reference to FIGS. 10-11, the first section 20 may comprise a front end 54 defining a front cavity and a rear end 56 defining a rear cavity (front and rear referring to their relative location to one another on the trailer 14). FIGS. 10-11 show the second section 22 arranged to engage with the rear cavity, so as to be at least partially positioned therein, and the third section 52 arranged to engage with the front cavity, so as to be at least partially positioned therein. However, it will be appreciated that this may be reversed, with the third section 52 arranged to engage with the rear cavity, so as to be at least partially positioned therein, and the second section 22 arranged to engage with the front cavity, so as to be at least partially positioned therein.

The third section 52 may comprise the same components as the first section 20 (as previously described), such as comprising at least one beam 28, pin hole 32, cart 40, wheel 42, height-variable member 44, contactable region 46, friction reducing pad 50, fulcrum 60, shield 66, and the like. Moreover, the third section 52 may co-act with the first section 20 in the same manner as the second section 22, including the arrangement in which the third section 52 may move longitudinally relative to the first section 20 and the co-action of the cart 40, height-variable member 44, contactable region 46, friction reducing pad 50, fulcrum 60, and/or shield 66. Alternatively, the first section 20 may have a plurality of carts 40, height-variable members 44, contactable regions 46, friction reducing pads 50, fulcrums 60, and/or shields 66 and the second section 22 and third section 52 may define cavities into which the carts 40, height-variable members 44, contactable regions 46, friction reducing pads 50, fulcrums 60, and/or shields 66 of the first section 20 are configured to engage to form the double stretch trailer 14.

With continued reference to FIGS. 10-11, the double stretch trailer 14 may be configured to move the third section 52 relative to the first section 20 to adjust the length of the trailer 14 in the frontwards direction, and the third section 52 may be pinned using the appropriate pin hole 32 (or other fixing mechanism) so as to fix the third section 52 relative to the first section 20. Moreover, the double stretch trailer 14 may be configured to move the second section 22 relative to the first section 20 to adjust the length of the trailer 14 in the rearwards direction, and the first section 20 may be pinned using the appropriate pin hole 32 (or other fixing mechanism) so as to fix the second section 22 relative to the first section 20.

Referring to FIGS. 10-11, the second section 22 and third section 52 may each comprise a beam 28, and the cart 40 and the contactable region 46 may be attached to the beam 28. The cart 40 may be arranged closer to an end of the beam 28 which first engages the respective cavity of the first section 20 compared to the contactable region 46.

Referring to FIGS. 10-11, as described in connection with FIG. 2, the double stretch trailer 14 may also include a low boy trailer. The low boy trailer 14 may include at least one gooseneck 58 to define a plurality of levels of the trailer 14. The trailer 14 may have a deck height at which the trailer 14 is attached to the cab 12. The trailer 14 may have a bed height at which the bed 24 of the first section 20 of the trailer 14 is positioned. The gooseneck 58 may connect the deck to the bed 24, such that the gooseneck 58 may define the distance between the deck height and bed height. The bed height may be lower to the ground than deck height in a low boy trailer (the bed 24 may be lower than the deck). The trailer 14 may have a wheel height corresponding to the height of the bed 24 at the rear wheels. The bed height may be lower to the ground than the wheel height in a low boy trailer (the bed 24 may be lower than the height of the trailer at the wheels). While the trailer 14 in FIGS. 10-11 is a low boy double stretch trailer, it will be appreciated that other styles of double stretch trailer may be included in the present disclosure.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent ranges that are within the spirit and scope of the appended claims. For example, it is to be understood that the present invention contemplates, to the extent possible, one or more features of any embodiment can be combined with one or more features of any other embodiment.

What is claimed is:

1. A trailer moveable by a cab, comprising:
a first section comprising a cavity; and
a second section comprising a beam at least partially positioned within the cavity and a height-variable member attached to the beam, wherein the second section is longitudinally movable relative to the first section, such that a length of the trailer is variable,
wherein the second section comprises a cart pivotably attached to the beam at a fulcrum, wherein the cart comprises at least one wheel configured to roll along a floor of the cavity, wherein the cart is pivotable about the fulcrum to co-act with the height-variable member,
wherein the second section is configured to move longitudinally relative to the first section by the cart rolling along the floor of the cavity.

2. The trailer of claim 1, wherein the height-variable member is configured to compress or decompress based on a load experienced by the trailer.

3. The trailer of claim 1, wherein the height-variable member comprises a deformable pad and/or a spring.

4. The trailer of claim 1, wherein the height-variable member comprises a hydraulic ram and/or a pneumatic airbag.

5. The trailer of claim 1, wherein the second section further comprises a friction reducing pad adjacent the cart.

6. The trailer of claim 5, wherein the friction reducing pad comprises a plastic material.

7. The trailer of claim 6, wherein the plastic material comprises a self-lubricating plastic material.

8. The trailer of claim 5, wherein the trailer is configured such that:
with the load experienced by the trailer below a threshold, the cart is in a first position in which the at least one wheel is in contact with the floor of the cavity and the friction reducing pad is not in contact with the floor of the cavity; and
with the load experienced by the trailer above the threshold, the cart is pivoted to a second position in which the at least one wheel is in contact with the floor of the cavity and the friction reducing pad is in contact with the floor of the cavity.

9. The trailer of claim 5, wherein the trailer is configured such that:
with the load experienced by the trailer below a threshold, the cart is in a first position in which the at least one wheel is in contact with the floor of the cavity and the height-variable member has a first thickness such that the friction reducing pad is not in contact with the floor of the cavity; and with the load experienced by the trailer above the threshold, the cart is pivoted to a second position in which the at least one wheel is in contact with the floor of the cavity and the height-variable member is compressed to have a second thickness smaller than the first thickness such that the friction reducing pad is in contact with the floor of the cavity.

10. The trailer of claim 1, wherein the second section further comprises a contactable region adjacent the cart.

11. The trailer of claim 10, wherein the trailer is configured such that:

with the load experienced by the trailer below a threshold, the cart is in a first position in which the at least one wheel is in contact with the floor of the cavity and the height-variable member has a first thickness such that the contactable region is not in contact with the floor of the cavity; and with the load experienced by the trailer above the threshold, the cart is pivoted to a second position in which the at least one wheel is in contact with the floor of the cavity and the height-variable member is compressed to have a second thickness smaller than the first thickness such that the contactable region is in contact with the floor of the cavity.

12. The trailer of claim 5, wherein the height-variable member is attached to a top side of the beam and the friction reducing pad is attached to an opposing bottom side of the beam.

13. The trailer of claim 1, wherein the cart is arranged on a first end of the beam which first engages the cavity, wherein the cart further comprises a shield arranged on the first end of the beam at a height configured to clear debris from the floor of the cavity when the cart is rolled along the floor of the cavity.

14. The trailer of claim 1, wherein the trailer comprises a low boy trailer.

15. The trailer of claim 1, wherein the first section comprises a front end defining a front cavity and a rear end defining a rear cavity;

wherein the second section is at least partially positioned within the front cavity;

wherein the trailer further comprises a third section at least partially positioned within the rear cavity, wherein the third section is longitudinally movable relative to the first section, such that a length of the trailer is variable, wherein the third section comprises a second beam at least partially positioned within the rear cavity and a second height-variable member attached to the second beam, wherein the third section comprises a second cart pivotably attached to the second beam at a second fulcrum, wherein the second cart comprises at least one second wheel configured to roll along a floor of the rear cavity, wherein the second cart is pivotable about the second fulcrum to co-act with the second height-variable member, wherein the third section is configured to move longitudinally relative to the first section by the second cart rolling along the floor of the rear cavity.

16. A towing system, comprising:

a cab; and the trailer of claim 1 connected to the cab.

17. A method for adjusting a length of a trailer moveable by a cab, comprising:

providing a first section of the trailer, the first section comprising a cavity;

inserting a second section of the trailer into the cavity and moving the second section longitudinally relative to the first section to a first trailer length; and fixing the trailer at the first trailer length by restricting longitudinal movement of the first section relative to the second section, wherein the second section comprises a cart pivotably attached to the beam at a fulcrum, wherein the cart comprises at least one wheel configured to roll along a floor of the cavity, wherein the cart is pivotable about the fulcrum to co-act with the height-variable member, wherein the second section is configured to move longitudinally relative to the first section by the cart rolling along the floor of the cavity.

18. The method of claim 17, wherein the second section further comprises a friction reducing pad adjacent the cart.

19. The method of claim 18, wherein moving the second section longitudinally relative to the first section to the first trailer length comprises:

after the second section is inserted more than a first distance into the first section, the cart is in a first position in which the at least one wheel is in contact with the floor of the cavity and the height-variable member has a first thickness such that the friction reducing pad is not in contact with the floor of the cavity; and before the second section is inserted more than the first distance into the first section, the cart is pivoted to a second position in which the at least one wheel is in contact with the floor of the cavity and the height-variable member is compressed to have a second thickness smaller than the first thickness such that the friction reducing pad is in contact with the floor of the cavity.

20. The method of claim 18, wherein moving the second section longitudinally relative to the first section to the first trailer length comprises:

with the load experienced by the trailer below a threshold, the cart is in a first position in which the at least one wheel is in contact with the floor of the cavity and the height-variable member has a first thickness such that the friction reducing pad is not in contact with the floor of the cavity; and with the load experienced by the trailer above the threshold, the cart is pivoted to a second position in which the at least one wheel is in contact with the floor of the cavity and the height-variable member is compressed to have a second thickness smaller than the first thickness such that the friction reducing pad is in contact with the floor of the cavity.

* * * * *